(12) United States Patent
Fujinaka et al.

(10) Patent No.: US 7,015,612 B2
(45) Date of Patent: Mar. 21, 2006

(54) BRUSHLESS MOTOR INCLUDING THRUST BEARING

(75) Inventors: Hiroyasu Fujinaka, Osaka (JP); Kumio Masuda, Yonago (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/991,422

(22) Filed: Nov. 19, 2004

(65) Prior Publication Data

US 2005/0140225 A1  Jun. 30, 2005

(30) Foreign Application Priority Data

Dec. 24, 2003  (JP)  ............... 2003-426811

(51) Int. Cl.
*H02K 5/16*  (2006.01)
*H02K 5/24*  (2006.01)

(52) U.S. Cl. .................................... 310/90.5
(58) Field of Classification Search ............... 310/51, 310/90, 90.5
See application file for complete search history.

(56) References Cited

U.S. PATENT DOCUMENTS

| | | | | |
|---|---|---|---|---|
| 3,397,929 A | * | 8/1968 | Gill et al. | 310/90.5 |
| 4,755,709 A | * | 7/1988 | De Jager | 310/90.5 |
| 5,019,738 A | * | 5/1991 | Weilbach et al. | 310/90.5 |
| 5,218,257 A | * | 6/1993 | Tozoni | 310/90.5 |
| 5,780,943 A | * | 7/1998 | Ono | 310/12 |
| 6,420,810 B1 | * | 7/2002 | Jeong | 310/90.5 |
| 6,849,978 B1 | * | 2/2005 | Sun et al. | 310/90.5 |
| 2004/0189125 A1 | * | 9/2004 | Doemen | 310/90.5 |

FOREIGN PATENT DOCUMENTS

| | | | | |
|---|---|---|---|---|
| JP | 55123019 A | * | 9/1980 | |
| JP | 5-68363 | | 3/1993 | |
| JP | 52-95010 | | 8/1997 | |
| JP | 09317755 A | * | 12/1997 | |
| JP | 10292819 A | * | 11/1998 | |

\* cited by examiner

*Primary Examiner*—Tran Nguyen
(74) *Attorney, Agent, or Firm*—Steptoe & Johnson LLP

(57) ABSTRACT

The present invention provides a low vibration brushless motor for reducing the vibration of the motor in an axial direction. In the brushless motor, a bearing is provided in a bearing boss, a shaft is held by the bearing, an end face of the shaft is contacting a thrust receiving member, and the shaft is rotatably axially supported by the bearing. The brushless motor includes a permanent magnet for attracting the end face of the shaft in the thrust direction with the thrust receiving member therebetween, and a bottom receiving part for supporting the permanent magnet, wherein the bearing boss, bearing, shaft, and bottom receiving part are made of a magnetic material, and a closed magnetic path is formed so that a magnetic flux passes through the permanent magnet, bottom receiving part, bearing boss, bearing, and shaft.

10 Claims, 4 Drawing Sheets

BRUSHLESS MOTOR INCLUDING THRUST BEARING

BACKGROUND OF THE INVENTION

1. Field of the Invention

The present invention relates to a spindle motor and the like used in a magnetic disc and an optical disc.

2. Description of the Related Art

Magnetic discs and the optical discs are becoming higher in speed and capacity year after year. Thus, high speed, high torque as well as low vibration and low noise are required for a spindle motor for driving the disc.

Rewritable DVD, for example, often performs writing at a maximum speed of about 6000 r/min, and since slight vibration of the disc may lead to a writing error, low vibration is especially required for the spindle motor driving the disc.

A method of reducing vibration of a spindle motor (particularly reducing vibration in a direction of thrust) includes a method of reducing vibration by providing a permanent magnet on either a rotor side or a stator side to attract a rotor in the direction of thrust with the permanent magnet, and suppressing lifting off of a shaft.

Another method includes a method of forming a shaft with a magnetic material and attracting the end face of the shaft with the permanent magnet. However, such method is not usually used in actual products. (Refer to JP 52-095010A and JP 05-068363A, for example).

In the former method of providing a permanent magnet on either a rotor side or a stator side and attracting a rotor in the direction of thrust with the permanent magnet, attracting force can be easily made stronger since the attracting surface area can be made larger. However, in order to secure a sufficient attracting force, a large permanent magnet needs be used, which increases the cost for the permanent magnet.

In the latter method of attracting a shaft with a permanent magnet, the attracting surface area is small and thus a sufficient attracting force is not obtained in many cases, resulting in that this method is seldom used.

SUMMARY OF THE INVENTION

The present invention has an object to provide a low-cost brushless motor that has a small vibration in the thrust direction, and a sufficient thrust attracting force obtained with a small and inexpensive magnet.

According to a first aspect of the present invention for achieving the above object, a brushless motor, in which a bearing is provided in a bearing boss, a shaft is held by the bearing, an end face of the shaft is contacting a thrust receiving member, and the shaft is rotatably axially supported by the bearing is provided, includes a permanent magnet for attracting the end face of the shaft in the thrust direction, with the thrust receiving member therebetween, and a bottom receiving part for supporting the permanent magnet. The bearing boss, the bearing, the shaft, and the bottom receiving part are made of a magnetic material, and a closed magnetic path is formed so that a magnetic flux passes through the permanent magnet, the bottom receiving part, the bearing boss, the bearing, and the shaft.

According to such configuration, the closed magnetic path is formed through which a magnetic flux passes through the permanent magnet, the bottom receiving part, the bearing boss, the bearing, and the shaft, so that a large attracting force can be obtained even with a small magnet.

According to a second aspect of the present invention, in the brushless motor according to the first aspect of the present invention, a space is provided between an outer periphery of the permanent magnet and the bottom receiving part.

By providing a space between the outer periphery of the permanent magnet and the bottom receiving part as mentioned above, a leakage magnetic flux is reduced and a large attracting force is obtained even with a small magnet.

According to a third aspect of the present invention, in the brushless motor according to the first or second aspect of the present invention, the permanent magnet is formed by being cut out from a block of anisotropic permanent magnet.

By forming the permanent magnet by being cut out from a block of anisotropic permanent magnet as mentioned above, productivity of the magnet is enhanced, and the cost of the magnet is reduced.

According to a fourth aspect of the present invention, in the brushless motor according to the first or second aspect of the present invention, the shape of the permanent magnet is a rectangular parallelepiped.

By having the shape of the permanent magnet in a rectangular parallelepiped shape as mentioned above, a space is provided at the outer periphery without performing special positioning.

According to a fifth aspect of the present invention, in the brushless motor according to the first or second aspect of the present invention, a pull-out-preventive stopper made of a magnetic material is fixed near the tip end portion of the shaft, which faces the permanent magnet.

By fixing the pull-out-preventive stopper made of a magnetic material near the tip end portion of the shaft facing the permanent magnet, the attracting force is further enhanced.

DETAILED DESCRIPTION OF THE PREFERRED EMBODIMENTS

Figure 1:
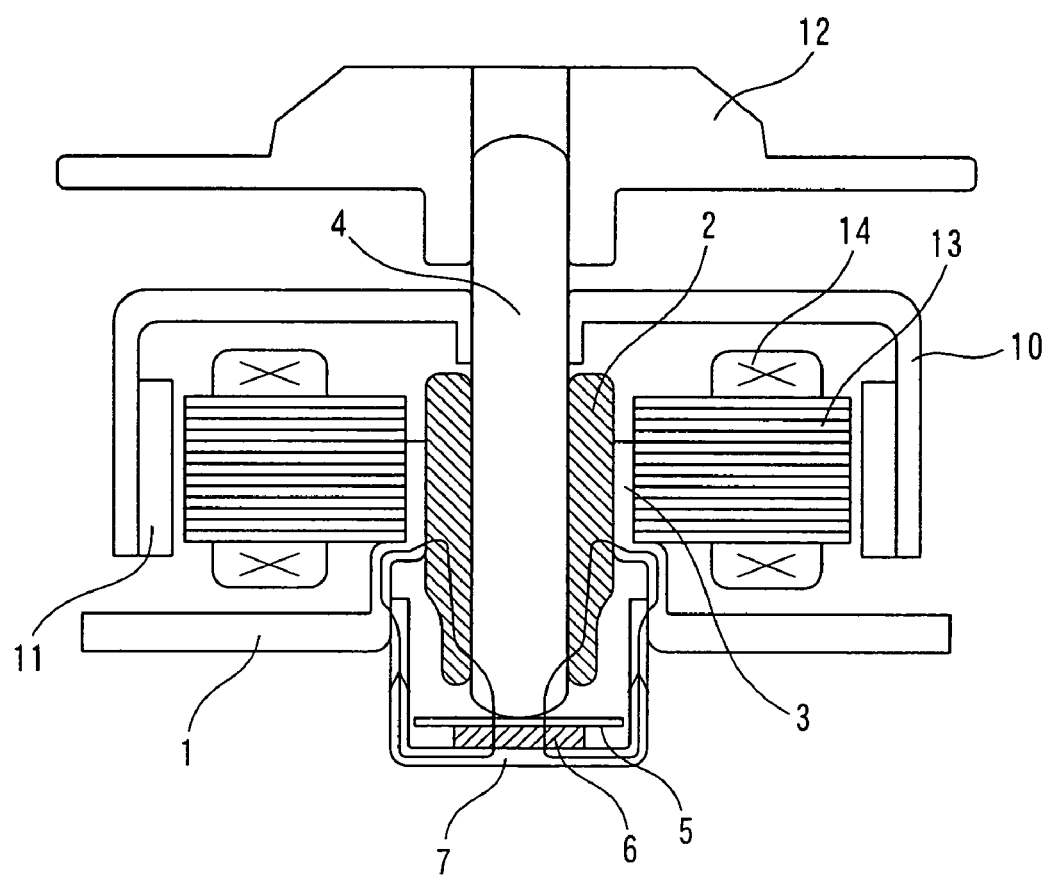
FIG. 1 is a schematic cross sectional view of a brushless motor according to a first embodiment of the present invention.

The preferred embodiments of the present invention will now be explained with reference to the figures.

A brushless motor according to the present invention includes a bearing boss 3 with a bearing 2 fixed to an inner periphery thereof, a shaft 4 rotatably held by the bearing 2, a thrust receiving member 5 that slidably moves with an end face of the shaft 4, a permanent magnet 6 for attracting the end face of the shaft 4 in one direction, with the thrust receiving member 5 sandwiched in between, and a bottom receiving part 7 for supporting the permanent magnet 6. The bearing boss 3, the bearing 2, the shaft 4, and the bottom receiving part 7 are made of a magnetic material, and forms a closed magnetic path of permanent magnet 6—bottom receiving part 7—bearing boss 3—bearing 2—shaft 4 through which a magnetic flux passes.

(First Embodiment)

FIG. 1 is a schematic cross sectional view of a brushless motor according to a first embodiment of the present invention.

In FIG. 1, reference number 1 denotes a base for attaching a motor to an apparatus, which base 1 is formed by molding a coated steel plate by press working, and the cylindrical bearing boss 3 for fixing the bearing 2 at a central part is integrally formed therewith.

The bearing 2 is a sintering oil-containing bearing made of iron or alloy material of for example, iron and copper, has a cylindrical shape and is press fit and fixed to the inner periphery of the bearing boss 3.

The shaft 4 is rotatably held by the bearing 2. A lower side end face of the shaft 4 has a tip end thereof formed into an R-shape, and is in a state to rotate with the thrust plate 5 (thrust receiving member) at a substantially point contacting state. The permanent magnet 6 formed into a triangular pole, a cube, a rectangular parallelepiped, a polygon pole, a coin shape (cylinder) or the like, that is single polarized in the axial direction is provided under the thrust plate 5, and acts to attract the shaft 4 in the downward direction. A lower side end face of the permanent magnet 6 contacts the bottom receiving part 7 that is molded into a cylindrical shape with a bottom by press working the coated steel plate. The bottom receiving part 7 is press fit and fixed to the lower part of the bearing boss 3 of the base 1 and supports the shaft 4 in the thrust direction by way of the thrust plate 5 and the permanent magnet 6.

In the present embodiment, not only the shaft 4 attracted by the permanent magnet 6 made of a magnetic material, but the bottom receiving part 7, the bearing boss 3, and the bearing 2 are all made of a magnetic material, thus forming a closed magnetic path which runs through the permanent magnet 6, bottom receiving part 7, bearing boss 3, bearing 2 and shaft 4, with the thrust plate 5 sandwiched therein, as shown with an arrow in FIG. 1.

With the closed magnetic path formed in such a way, the permeance of the magnetic flux is increased, and a greater amount of magnetic flux can be produced even with a permanent magnet of the same size and the same performance, thus improving the magnetic attracting force.

The bearing 2 used is desirably made by a sintered alloy containing iron at a weight ratio of equal to or greater than 50%. Generally, in the sintering oil-containing bearing, if metals other than iron as represented by copper, zinc and the like are used, frictional resistance with the shaft is smaller, and is advantageous in terms of motor power consumption, for example. However, if the weight ratio of iron is too small, the magnetic permeability and the saturation magnetic flux density of the material become small and thus a sufficient magnetic flux can not be obtained and the magnetic attracting force decreases.

The material used for the thrust plate 5 is suitably a resin plate having excellent wear resistance such as PEEK (polyether ether ketone), POM (polyacetal), or PET (polyethylene terephthalate), ceramic, or super steel alloy.

Through the use of a material having excellent wear resistance, the plate does not greatly wear even if the thrust plate 5 is made thin, and the attracting force can also be improved by providing the plate at the clearance between the shaft 4 and the permanent magnet 6.

The method may also be such that a coating with a low coefficient of friction such as PEFE (poly tetrafluoroethylene) is applied to the surface of the magnet so as to slidably move the coating relative to the shaft. In this case, a component such as the thrust plate 5 needs not be provided.

In order to obtain a sufficient magnetic attracting force in the configuration of the present embodiment, other points such as the following should also be noted.

The first point concerns the space at the outer periphery of the permanent magnet.

Figure 2A:
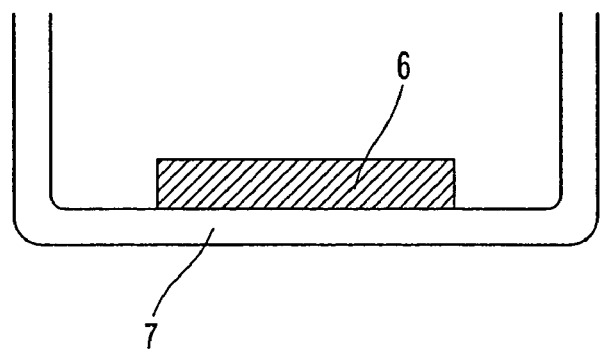
FIG. 2A illustrates a positional relation of a permanent magnet and a bottom receiving part according to the first embodiment of the present invention, with sufficient clearance between an outer periphery of the permanent magnet and the bottom receiving part.
Figure 2B:
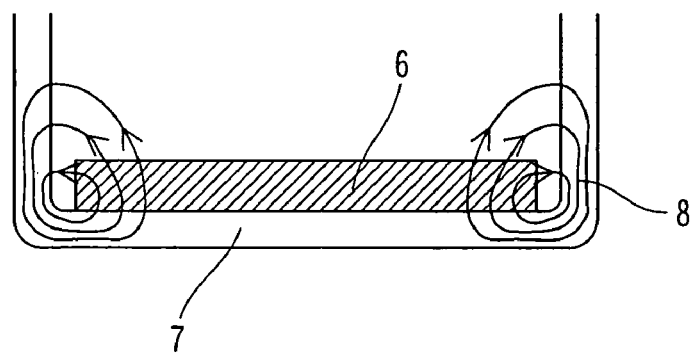
FIG. 2B illustrates a positional relation of the permanent magnet and the bottom receiving part according to the first embodiment of the present invention, without sufficient clearance between the outer periphery of the permanent magnet and the bottom receiving part.

FIG. 2A and FIG. 2B illustrate the configuration of the permanent magnet and the bottom receiving part.

FIG. 2A shows a case in which there is sufficient clearance between the outer periphery of the permanent magnet 6 and the bottom receiving part 7, and FIG. 2B shows a case in which there is no sufficient clearance between the outer periphery of the permanent magnet 6 and the bottom receiving part 7.

As shown in FIG. 2B, when sufficient clearance is not present between the outer periphery of the permanent magnet 6 and the bottom receiving part 7, the magnetic flux produced near the end faces of the permanent magnet directly leaks out from the sides of the bottom receiving part 7 and becomes a leakage flux 8. Thus, not only is the magnetic flux unable to be used for attraction of the shaft, but since the magnetic flux that passes through the bottom receiving part 7 increases, the magnetic flux density of the bottom receiving part 7 increases, leading to a magnetic saturation of the bottom receiving part 7, which may greatly reduce the magnetic attracting force. Therefore, it is desirable to provide a certain amount of space at the outer periphery of the permanent magnet 6.

The second point concerns the material of the permanent magnet.

In the present embodiment, the permanent magnet having a stronger magnetic force is suitably used so that a sufficient attracting force is obtained at a small space of the bottom receiving part 7.

Anisotropic Sm—Co sintered permanent magnet, anisotropic Nd—Fe—B sintered permanent magnet and the like have strong magnetic force and are thus suitable for the application.

However, the anisotropic permanent magnet such as the anisotropic Sm—Co sintered permanent magnet, and the anisotropic Nd—Fe—B sintered permanent magnet must be performed with magnetic field orientation during molding so as to be molded with the directivity of the particles aligned. Therefore, the molding equipment requires electromagnet, yoke and the like to apply magnetic field orientation and is thus greater than the molding equipment using an isotropic permanent magnet of the same size. Further, there is a disadvantage that it is difficult to miniaturize the equipment even if the permanent magnet itself is miniaturized.

Figure 3:
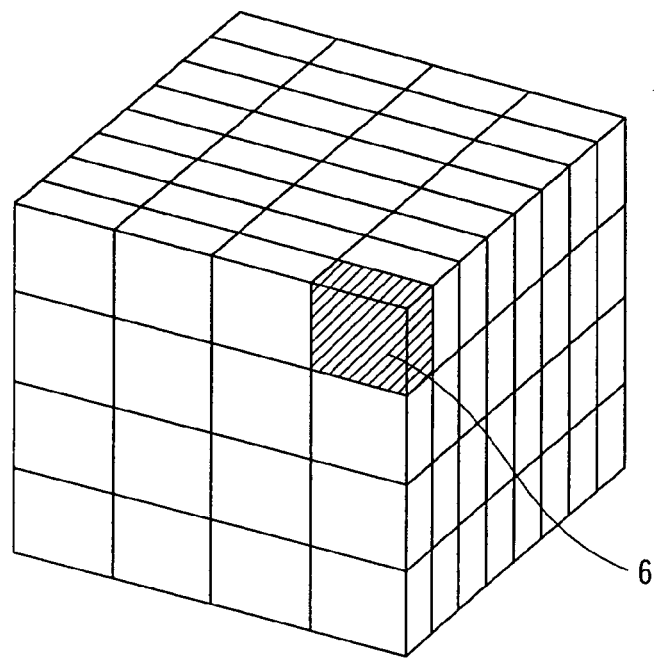
FIG. 3 illustrates a method of forming the permanent magnet according to the first embodiment of the present invention.

Therefore, in the present embodiment, the permanent magnet is molded to be a relatively large magnet block, and the molded block is cut vertically and horizontally after sintering, to provide a rectangular parallelepiped permanent magnet chip, as shown in FIG. 3.

With such method of forming, the cutting steps are increased, but the cost of the magnet including the cost of the molding equipment and the man-hour during molding is reduced. Especially in a small permanent magnet having a size of equal to or less than a 5 mm cube, as in the present embodiment, a significant cost reduction is obtained.

In a method using such cutting steps, the outer shape of the magnet is preferably a rectangular parallelepiped. This is because when the outer shape of the magnet is coin shaped (cylinder) or is a polygonal, not only does the cutting steps become complicating, but the volume of the wasted part when cut from the block becomes large. Further, a method of molding the permanent magnet into a rectangular parallelepiped of the present embodiment not only reduces the cost of the permanent magnet but also achieves the effect of enhancing the magnetic attracting force. It is to be noted that the present invention does not exclude shapes other than the rectangular parallelepiped for the outer shape of the permanent magnet.

Figure 4:
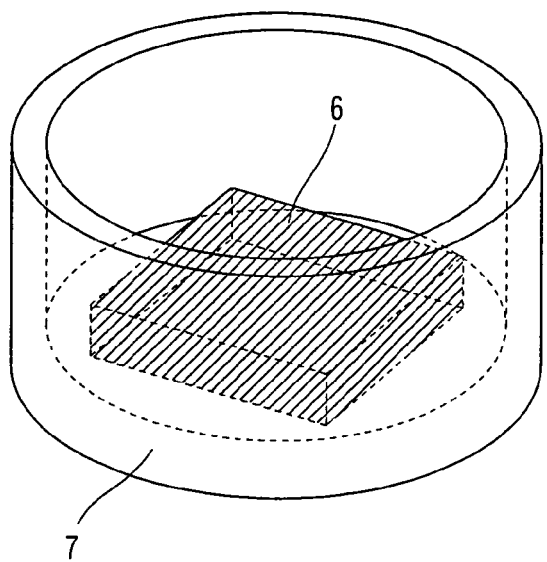
FIG. 4 is a perspective view of the bottom receiving part according to the first embodiment of the present invention.

FIG. 4 is a perspective view showing a state in which the permanent magnet according to the present embodiment is inserted into the bottom receiving part 7 of a cylindrical shape having a bottom. As shown in FIG. 4, a certain amount of space is consequently formed at the four sides of the outer periphery of the permanent magnet 6 with the inner periphery of the bottom receiving part 7. By providing a space at the outer periphery of the permanent magnet 6, as in the same way as the above explanation, the leakage magnetic flux is decreased, and a stable attracting force can be obtained even with a small magnet.

In FIG. 4, the outer shape of the permanent magnet 6 is a rectangular parallelepiped. If the outer shape of the magnet is made triangle, the manufacturing cost of the permanent magnet may increase slightly but a relatively large space can be provided between the outer periphery of the permanent magnet 6 and the inner periphery of the bottom receiving part 7, and thus the leakage magnetic flux can be further reduced and a more stable attracting force can be obtained.

In FIG. 1, reference number 10 denotes a rotor frame and is press fit and fixed to the upper part of the shaft 4. Reference number 11 denotes a rotor permanent magnet and is provided at the inner peripheral surface of an outer peripheral wall of the rotor frame 10. Reference number 12 denotes a supporting member for supporting for example, a magnetic disc and an optical disc, and a tip end of the shaft 4 is inserted into a boss hole.

An iron core 13 in which a plurality of thin iron plates are stacked one over the other is fitted into an outer peripheral edge of the bearing boss 3, and a conductor 14 is wrapped around the outer periphery of the iron core 13.

With the above configuration, when the conductor 14 conducts electricity, the electromagnet consisting of the conductor 14 arranged at the outer periphery of the iron core 13 and the permanent magnet 11 attract or repel each other, thus applying rotating force to the rotor frame 10 to rotate the shaft 4. When the shaft 4 rotates at high-speed, the thrust plate 5 is sometimes lifted and may vibrate the shaft 4 in the thrust direction. Therefore, the permanent magnet 6 arranged at the lower part of the thrust plate 5 attracts the shaft 4 in the downward direction, and suppresses the vibration of the shaft 4. As shown in FIG. 1, by forming a magnetic path, the force of the permanent magnet 6 to attract the shaft 4 becomes stronger.

Figure 5:
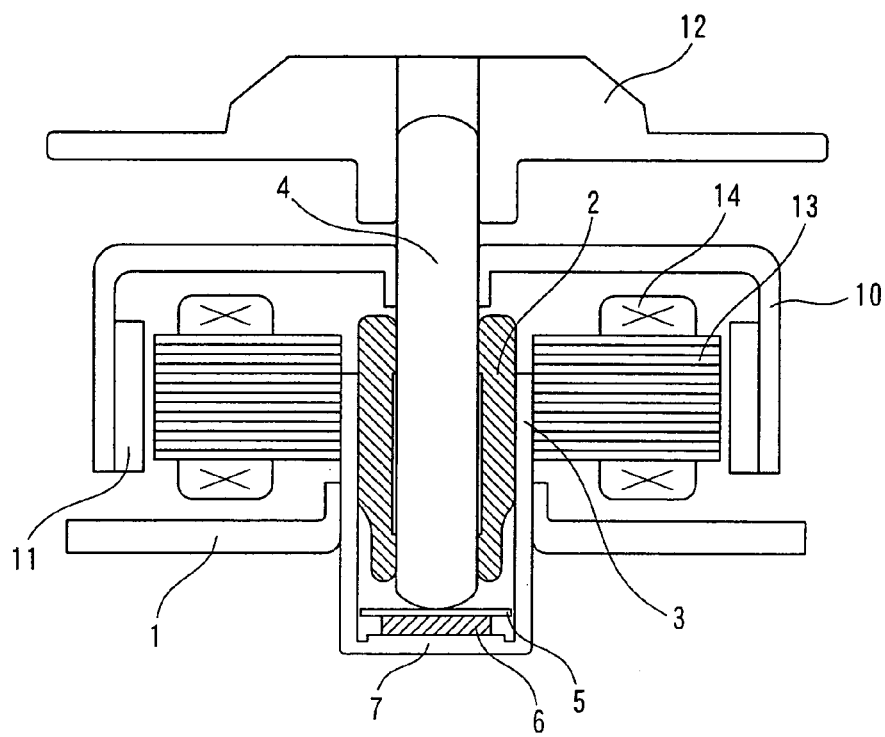
FIG. 5 is a schematic cross sectional view of another example of the brushless motor according to the first embodiment of the present invention.

FIG. 5 shows a variant of the first embodiment. In the above first embodiment, a configuration in which the bearing boss 3 is integrally molded with the base 1 for fixing the motor to the apparatus is shown, but as shown in FIG. 5, the bottom receiving part 7 and the bearing boss 3 may be integrally molded as a single component, and press fit and fixed to an inserting hole of the base 1. Further, the bearing 2 and the bearing boss 3 may be integrally molded as a single sintered body (not shown).

(Second Embodiment)

Figure 6:
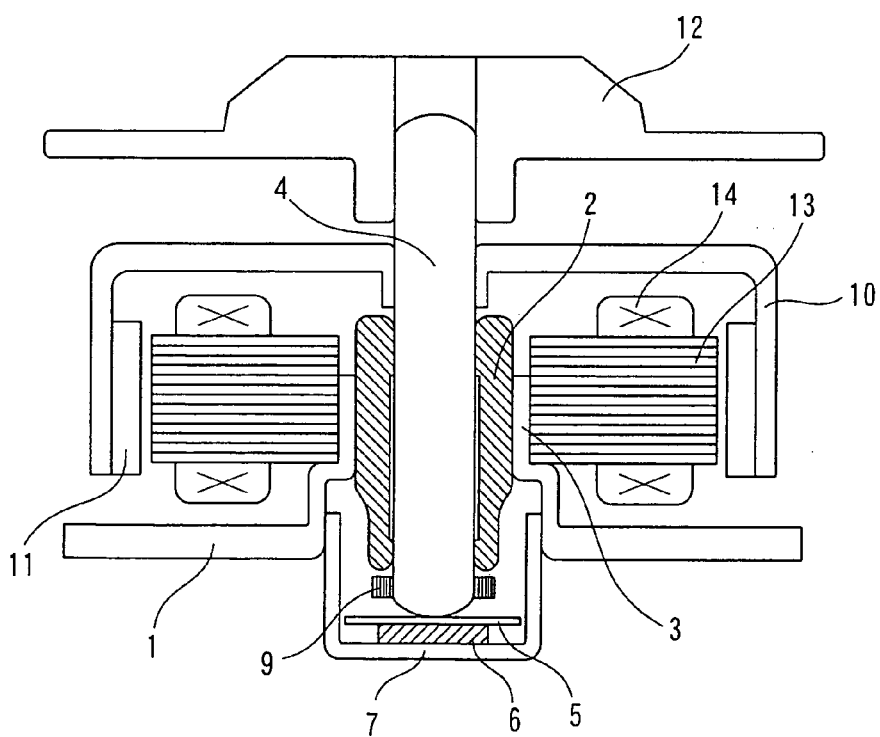
FIG. 6 is a schematic cross sectional view of a brushless motor according to a second embodiment of the present invention.

FIG. 6 is a schematic cross sectional view of a brushless motor according to a second embodiment of the present invention.

In FIG. 6, the configuration of the motor is substantially the same as the configuration of the motor according to the first embodiment shown in FIG. 1, but different in that a ring shaped pull-out-preventive stopper 9 made of iron is press fit and fixed at a portion of the tip end of the shaft 4 facing the permanent magnet 6.

By attaching a magnetic body near the tip end of the shaft 4 as above, a similar behavior as when the opposing surface areas of the shaft and the permanent magnet are made large is obtained, and the attracting force is improved.

When such magnetic body also acts as pull-out-preventive stopper for the rotor, there is no need to additionally provide a pull-out-preventive stopper and thus the cost of the motor is reduced.

The pull-out-preventive stopper 9 may not necessarily be made of iron and may be made of a permanent magnet so as to attract with the permanent magnet 6.

The brushless motor according to the present invention is suitable for reducing the vibration in the axial direction of the motor, and is useful in an application that requires low vibration, for example, a spindle motor of a magnetic disc, an optical disc and the like.

What is claimed is:

1. A brushless motor in which a bearing is provided in a bearing boss and a shaft is held by the bearing, the shaft having an end face contacting a thrust receiving member and being rotatably axially supported by the bearing, the brushless motor comprising:

a permanent magnet for attracting the end face of the shaft in the thrust direction, with the thrust receiving member therebetween; and a bottom receiving part for supporting the permanent magnet, wherein the bearing boss, the bearing, the shaft, and the bottom receiving part are made of a magnetic material, and a closed magnetic path is formed so that a magnetic flux passes through the permanent magnet, the bottom receiving part, the bearing boss, the bearing, and the shaft.

2. The brushless motor as claimed in claim 1, wherein a space is provided between an outer periphery of the permanent magnet and the bottom receiving part.

3. The brushless motor as claimed in claim 1, wherein the permanent magnet is formed by being cut out from a block of anisotropic permanent magnet.

4. The brushless motor as claimed in claim 1, wherein the permanent magnet is shaped to be a triangular or rectangular parallelepiped.

5. The brushless motor as claimed in claim 1, wherein the shaft is fixed with a pull-out-preventive stopper made of a magnetic material at a tip end portion thereof facing the permanent magnet.

6. A brushless motor comprising:

a magnetic thrust bearing comprising a bearing boss and a shaft held by the bearing, the shaft having an end face contacting a thrust receiving member and being rotatably supported by the bearing, a receiving part for supporting a permanent magnet;

a permanent magnet being single polarized and magnetized in the axial direction of the shaft, and attracting the shaft;

said permanent magnet being located adjacent the thrust receiving member contacted by the end face of the shaft;

wherein the bearing boss, the bearing, the shaft, and the receiving part comprise a magnetic material so that a closed magnetic path for a magnetic flux passes through the permanent magnet, the receiving part, the bearing boss, the bearing, and the shaft.

7. The brushless motor as claimed in claim 6, wherein an outer periphery of the permanent magnet and the receiving part are spaced apart.

8. The brushless motor as claimed in claim 6, wherein the permanent magnet is an anisotropic permanent magnet.

9. The brushless motor as claimed in claim 6, wherein the permanent magnet is a triangular or rectangular parallelepiped.

10. The brushless motor as claimed in claim 6, wherein the shaft is fixed in place by a pull-out-preventive stopper comprising a magnetic material at a tip end portion thereof facing the permanent magnet.

* * * * *